United States Patent
Spadafora et al.

(10) Patent No.: US 8,234,045 B2
(45) Date of Patent: Jul. 31, 2012

(54) FAILURE MODE EFFECTS MITIGATION IN DRIVE-BY-WIRE SYSTEMS

(75) Inventors: William Spadafora, Clarkston, MI (US); David Llewellyn, West Bloomfield, MI (US); Perry Paielli, Brighton, MI (US); Jason Kramer, Macomb Township, MI (US)

(73) Assignee: Robert Bosch GmbH, Stuttgart (DE)

( * ) Notice: Subject to any disclaimer, the term of this patent is extended or adjusted under 35 U.S.C. 154(b) by 980 days.

(21) Appl. No.: 12/236,957

(22) Filed: Sep. 24, 2008

(65) Prior Publication Data

US 2010/0076650 A1 Mar. 25, 2010

(51) Int. Cl.
*B62D 11/00* (2006.01)
*G05D 1/00* (2006.01)
*B60R 22/00* (2006.01)
*G06F 7/00* (2006.01)
*B60B 39/00* (2006.01)
*G08B 29/00* (2006.01)

(52) U.S. Cl. .................. 701/43; 701/1; 701/48; 701/53; 701/71; 340/507

(58) Field of Classification Search ................. 701/1, 43, 701/48, 53, 71; 340/507; 700/285
See application file for complete search history.

(56) References Cited

U.S. PATENT DOCUMENTS

| 3,847,243 A | 11/1974 | Barth |
| 3,877,537 A | 4/1975 | Ohms et al. |
| 3,893,528 A | 7/1975 | Rehfeld |

(Continued)

FOREIGN PATENT DOCUMENTS

WO 2006/001950 1/2006

OTHER PUBLICATIONS

Aleksander Hac, et al., "Unified Control of Brake- and Steer-by-Wire Systems Using Optimal Control Allocation Methods", SAE Technical Paper Series, Apr. 3-6, 2006.
B. Hedenetz, et al., "Brake-by-wire without Mechanical Backup by Using a TTP-Communication Network", Available online at: <http://www.vmars.tuwien.ac.at/projects/xbywire/projects/new-BBW.html>, 20 pages, printed from website on Feb. 29, 2008.

(Continued)

*Primary Examiner* — James P Trammell
*Assistant Examiner* — Majdi Alsomiri
(74) *Attorney, Agent, or Firm* — Michael Best & Friedrich LLP

(57) ABSTRACT

Systems and methods for mitigating failure mode effects in a steer-by-wire system. The system includes a controller configured to alter a direction of the vehicle when the controller is in a failure mode. A steering device is coupled to a detector. The detector is configured to detect a steering input from a driver and output a signal representative of the steering input. A first actuator is coupled to a first control device. The first control device is configured to generate a first control signal representative of the steering input when the controller is in the failure mode. The first actuator alters the direction of the vehicle by removing energy from the vehicle. A second actuator is coupled to a second control device. The second control device is configured to generate a second control signal representative of the steering input when the controller is in the failure mode. The second actuator alters the direction of the vehicle by adding energy to the vehicle.

21 Claims, 8 Drawing Sheets

U.S. PATENT DOCUMENTS

| | | | |
|---|---|---|---|
| 5,741,202 | A | 4/1998 | Huber |
| 5,749,633 | A | 5/1998 | Baumgartner |
| 6,065,558 | A | 5/2000 | Wielenga |
| 6,076,626 | A | 6/2000 | Bohner et al. |
| 6,125,314 | A | 9/2000 | Graf et al. |
| 6,279,674 | B1 | 8/2001 | Lissel et al. |
| 6,298,941 | B1 | 10/2001 | Spadafora |
| 6,360,149 | B1 | 3/2002 | Kwon et al. |
| 6,428,448 | B2 | 8/2002 | Saito et al. |
| 6,442,462 | B1 | 8/2002 | Nishizaki et al. |
| 6,548,969 | B2 | 4/2003 | Ewbank et al. |
| 6,575,264 | B2 | 6/2003 | Spadafora |
| 6,719,087 | B2 | 4/2004 | Demerly |
| 6,729,844 | B2 * | 5/2004 | Bettencourt ............... 416/1 |
| 6,735,510 | B2 | 5/2004 | Hac |
| 6,808,041 | B2 | 10/2004 | Demerly |
| 6,853,902 | B2 | 2/2005 | Miller et al. |
| 6,909,951 | B2 | 6/2005 | Llewellyn et al. |
| 6,923,510 | B2 | 8/2005 | Hac |
| 6,991,573 | B2 * | 1/2006 | Yun ............................ 475/149 |
| 2002/0183911 | A1 * | 12/2002 | Tashiro et al. ............. 701/48 |
| 2003/0120401 | A1 * | 6/2003 | Bauer et al. ............... 701/29 |
| 2006/0015231 | A1 * | 1/2006 | Yoshimura et al. ........ 701/48 |
| 2006/0042858 | A1 | 3/2006 | Boyle et al. |
| 2006/0185921 | A1 * | 8/2006 | Cieler et al. ............. 180/204 |
| 2008/0133066 | A1 * | 6/2008 | Takenaka ..................... 701/1 |
| 2008/0228323 | A1 * | 9/2008 | Laumer et al. ............ 700/285 |
| 2009/0024293 | A1 * | 1/2009 | Takenaka et al. .......... 701/71 |

OTHER PUBLICATIONS

Yixin Yao, "Vehicle Steer-by-Wire System Control", SAE Technical Paper Series, Apr. 3-6, 2006.

"Sensotronic Brake Control the Brakes of the Future", Available online at: <http://www.autoweb.com.au/cms/newsarticle.html?&id=MER&doc=mer0011231>, 4 pages, dated Nov. 23, 2000.

Larry Carley, "Brake-By-Wire", Available online at: <http://www.aa1car.com/library/2004/bf110412.htm>, 6 pages, printed from website on Jan. 2, 2009.

"Mitsubishi S-AWC", Available online at: <http://en.wikipedia.org/wiki/Mitsubishi_S-AWC>, 5 pages, printed from website on Mar. 26, 2008.

"Drive by wire", Available online at: <http://en.wikipedia.org/wiki/Drive_by_wire>, 3 pages, printed from webstie on Feb. 6, 2008.

"Car handling", Available online at: <http://en.wikipedia.org/wiki/Car_handling>, 13 pages, printed from website on Feb. 6, 2008.

"Torque Steering", Available online at: <http://en.wikipedia.org/wiki/Torque_steering>, 2 pages, printed from website on Feb. 6, 2008.

"Steering", Available online at: <http://en.wikipedia.org/wiki/Steering>, 5 ppages, printed from website on Feb. 6, 2008.

* cited by examiner

FAILURE MODE EFFECTS MITIGATION IN DRIVE-BY-WIRE SYSTEMS

BACKGROUND

The present invention relates to steer-by-wire (SbW) systems.

Many SbW systems include a detector, a steering converter, and a steering actuator. In a conventional mechanical steering system, a failure occurs, for example, when a mechanical link between a steering wheel and turning wheels in a vehicle breaks. In a SbW system, there is no direct mechanical link between an input control device (e.g., a steering wheel, pedals, levers, etc.) and the turning wheels. Nonetheless, a SbW system can suffer a failure when, for example, a steering converter or steering actuator malfunctions or is broken. When a failure occurs, the ability the steer the vehicle is lost or impaired.

SUMMARY

In light of the impact that a failure can have, there is a need for methods and systems for mitigating or eliminating failure mode effects in SbW systems. The following summary sets forth certain embodiments of such methods and systems. However, it does not set forth all such embodiments. In addition, variations and modifications of the embodiments described are possible.

A number of solutions are provided for situations where failures occur in a steering converter or a steering actuator. In some embodiments, sensors on a vehicle are used to measure the actual direction of the vehicle. In addition, sensors in a steering detector (or, more simply, a "detector") are used to measure a steering input from a driver. If the actual direction of the vehicle does not match the steering input from the driver, a failure in the steering converter or steering actuator may have occurred. When a failure occurs, one or both of two contingent techniques of steering control are implemented. One technique is a passive technique in which energy is removed from the vehicle (or vehicle system). Another technique is an active technique in which energy is added and removed from the vehicle (or vehicle system). Regardless of which technique is used, steering is provided by controlling the vehicle wheels to cause the vehicle to turn without relying on the primary steering system (i.e., the SbW system).

In one embodiment, the invention provides a steer-by-wire failure mode mitigation system for a vehicle. The system includes a driver input device (for example, a steering wheel, joystick, pedals, keyboard, etc.). The driver input device is configured to receive a steering input from a driver of the vehicle. A detector is configured to detect the steering input and to output a signal representative of the steering input. A controller is configured to operate in one of two modes: a first operational mode and a second operational mode. The controller is coupled to the detector, a first control device, a second control device which is different than the first control device, and a third control device which is different than the first control device and the second control device. A first actuator is coupled to the first control device and a second actuator is coupled to the second control device. The first control device receives a first command input signal from the controller when the controller is in the first operational mode. The first control device generates a first control signal representative of the steering input and transmits the first control signal to the first actuator. The first actuator generates a first mechanical output to alter a direction of a first turning wheel and a second turning wheel.

The second control device receives the first command input signal when the controller is in the second operational mode. The second control device generates a second control signal representative of the steering input and transmits the second control signal to the second actuator. The second actuator generates a second mechanical output to exert a first force on the first turning wheel in a first direction. A third actuator is coupled to the third control device. The third control device receives the first command input signal when the controller is in the second operational mode. The third control device generates a third control signal representative of the steering input and transmits the third control signal to the third actuator. The third actuator generates a third mechanical output operable to exert a second force on the second wheel in a second direction.

In another embodiment the invention provides a method of steering a vehicle during a steer-by-wire failure. The method includes receiving a steering input from a driver of the vehicle and detecting the steering input with a detector. The detector outputs a signal representative of the steering input. A first control device receives a first command input signal when the controller is in a first operational mode. In response, the first control device generates a first control signal representative of the steering input and transmits the first control signal to a first actuator. The first actuator alters a direction of a first wheel and a second wheel. The method also includes receiving, at a second control device, the first command input signal when the controller is in a failure mode. In response, the second control device generates a second control signal representative of the steering input and transmits the second control signal to the second actuator. The second actuator exerts a first force on the first wheel in a first direction. A third control device receives the first command input signal when the controller is in the failure mode. The third control device generates a third control signal representative of the steering input and transmits the third control signal to the third actuator. In response to the third control signal, the third actuator exerts a second force on the second wheel in a second direction.

In yet another embodiment, the invention provides a steer-by-wire system for a vehicle. The system includes a controller configured to alter a direction of the vehicle during a steer-by-wire failure. A steering device is coupled to a detector. The detector is configured to detect a steering input from a driver and output a signal representative of the steering input. A first actuator is coupled to a first control device. The first control device is configured to generate a first control signal representative of the steering input when the controller is in the failure mode. The first actuator alters the direction of the vehicle by removing energy from the vehicle. A second actuator is coupled to a second control device. The second control device is configured to generate a second control signal representative of the steering input when the controller is in the failure mode. The second actuator alters the direction of the vehicle by adding energy to the vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
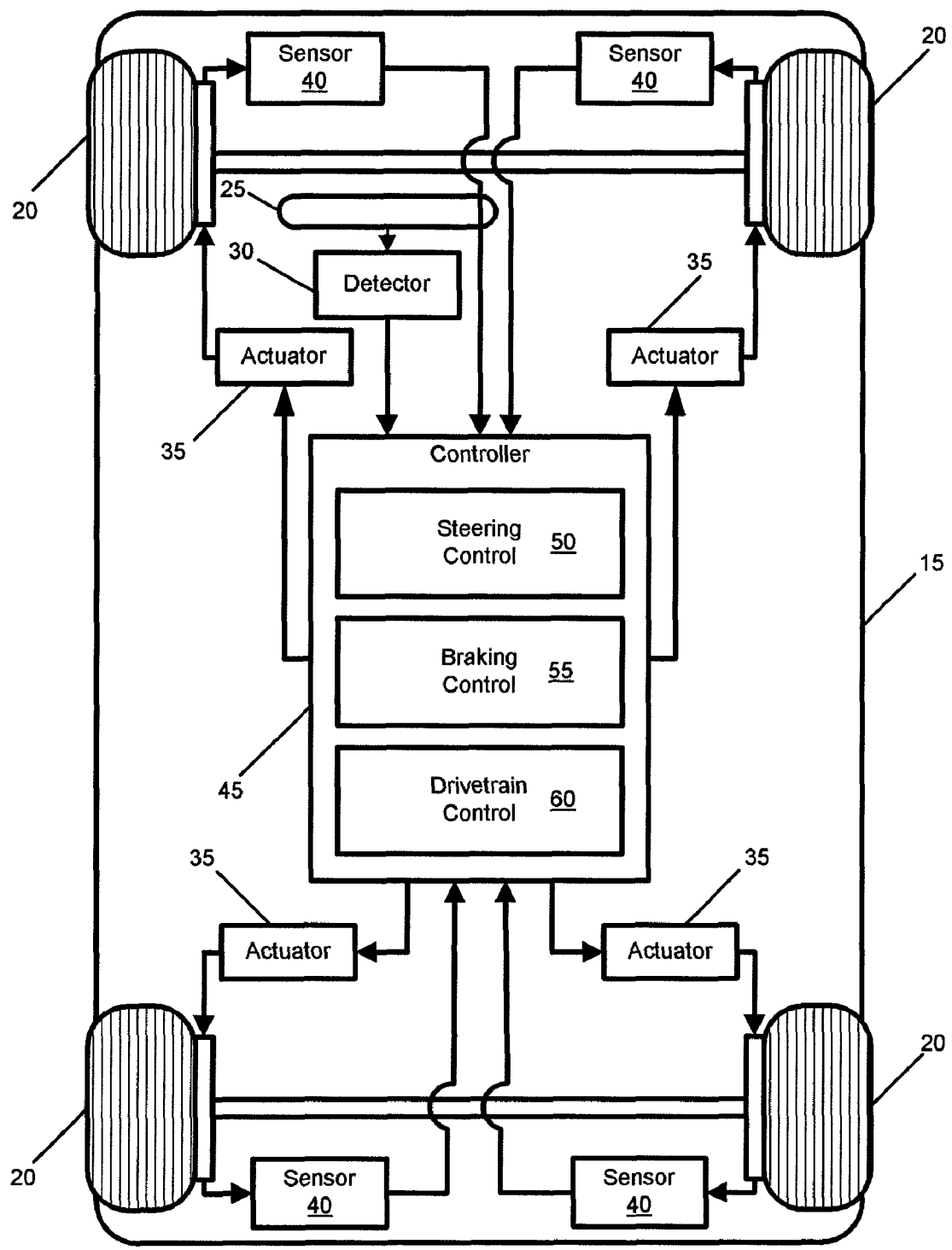
FIG. 1 illustrates a steer-by-wire system according to an embodiment of the invention.

FIG. 1 illustrates a steer-by-wire (SbW) failure mode mitigation system 10 for a vehicle 15. The vehicle 15 includes, among other things, a plurality of wheels 20, a driver input device 25 (such as a steering wheel, levers, keyboard, joystick, or other device for indicating a desired steering direction), a detector 30 (a device that detects mechanical movement of the driver input device and generates an electrical or similar signal representative of the movement), a plurality of actuators 35, a plurality of sensors 40, a controller 45, a steering control subsystem 50, a braking control subsystem 55, and a drivetrain control subsystem 60. In one embodiment, the controller 45 includes a processing unit (such as a microprocessor), memory, and a bus. The bus connects various controller components (such as the memory) to the processing unit. In one embodiment, the memory includes read only memory (ROM) and random access memory (RAM). The controller 45 also includes an input/output interfaces and software that includes routines for transferring information between components within the controller 45. In other embodiments, the controller 45 can include additional, fewer, or different components. The controller 45 is also configured to communicate with other components or subsystems within the vehicle 15 using, for example, a CAN-bus.

Software included in the implementation of the system is stored in the ROM or RAM of the controller 45. The software includes, for example, an operating system, one or more applications, program data, and other program modules.

The steering control subsystem 50, the braking control subsystem 55, and the drivetrain control subsystem 60 are among a plurality of control subsystems within the vehicle 15. Each control subsystem is described as being coupled to the controller 45. The vehicle 15 is illustrated as including one actuator and one sensor for each wheel 20. However, as described below, each control subsystem can include multiple actuators 35 and multiple sensors 40. Additionally, the actuators 35 and sensors 40 for each control subsystem are, in many instances, independent from the other control subsystems in the vehicle 15. Each actuator 35 can also be described as an actuation system for a respective control subsystem. For example, a braking actuation system includes, among other things, an electronic braking unit and a plurality of brakes. In contrast, a drivetrain actuation system includes, among other things, a throttle body, and engine, a transmission, a plurality of differentials, a transfer case, a driveshaft, a front axle, and a rear axle. The actuation systems are illustrated and referenced as a single device or a single block for descriptive purposes. However, no implication is intended that only a single actuator or a single set of actuators is required to implement the SbW system 10.

The detector 30 detects an intended steering input action from a driver, such as, for example, a steering movement, from the driver input device 25 (e.g. a steering wheel, a joystick, a control lever, a touch screen, or the like) and sends an input signal(s) representative of the intended steering input action to the steering, braking, or drivetrain control subsystems 50, 55, and 60. One or more of the steering, braking, and drivetrain control subsystems 50, 55, and 60 then generate control signals that are used to alter a direction of the vehicle 15. Each of the control subsystems is described below.

Figure 2:
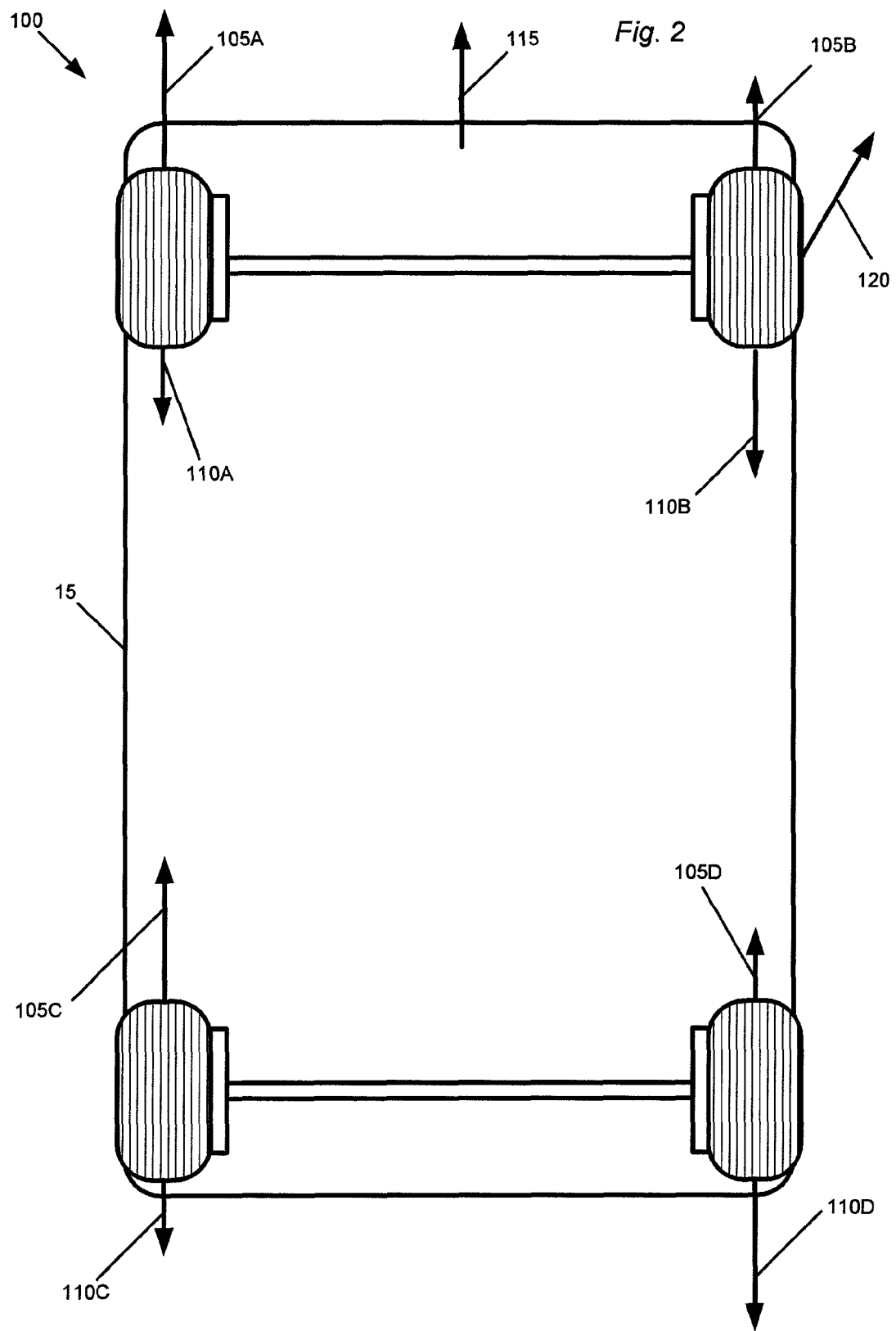
FIG. 2 illustrates a set of forces acting on a vehicle.

A set of forces 100 acting on the vehicle 15 is illustrated in FIG. 2. The vehicle 15 experiences, for example, motive forces 105(A-D) and counter forces 110(A-D). The motive forces include a drivetrain force 105 which is related to energy provided to each wheel by a vehicle power plant, such as an engine, as well as a kinetic force 115 that is related to the mass and the speed of the vehicle 15. The counter forces 110 are, for example, friction or braking forces 110A-110D are applied to the wheels 20. A difference in magnitude of the front left wheel motive force 105A and the front right wheel motive force 105B and the difference in magnitude of the rear left wheel motive force 105C and the rear right wheel motive force 105D results in differential forces between each front wheel and each rear wheel. A summation of the set of forces on the vehicle produces a resulting force 120 that is in a direction corresponding to the intended steering action of a driver. For example, if the intended input action is a change in the direction of the vehicle 15 to the right, the front left wheel motive force 105A is greater in magnitude than the front right wheel motive force 105B. The result of the difference between the front left wheel motive force 105A and the front right wheel motive force 105B causes a change in the direction of the vehicle 15 to the right. Additionally or alternatively, a front right wheel braking force 110B is applied that is greater in magnitude than a front left wheel braking force 110A. The difference between the two braking forces causes a change in the direction of the vehicle 15 to the right, or if used in combination with the motive forces 105 described above, causes the change in the direction of the vehicle 15 to occur more quickly.

Figure 3:
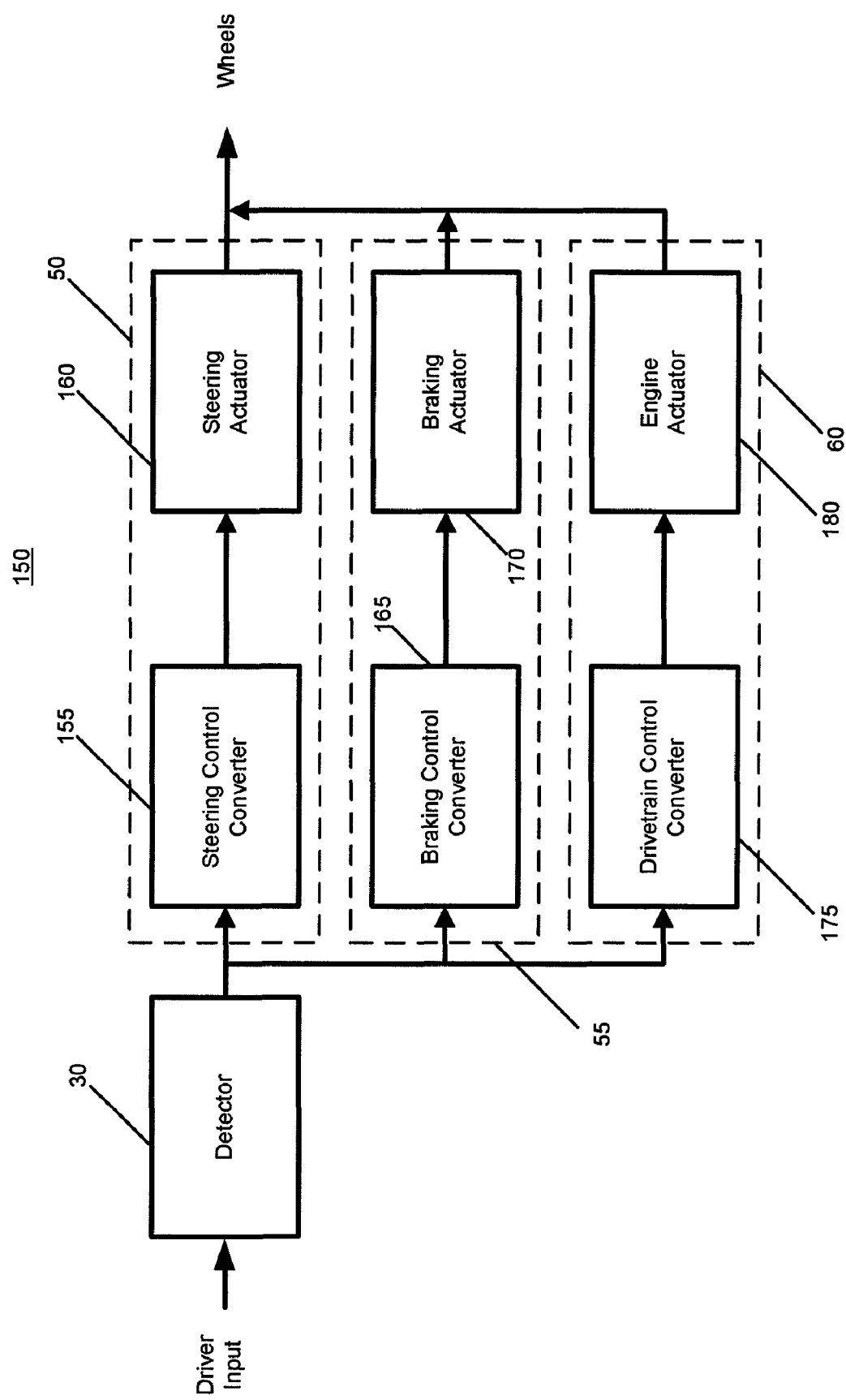
FIG. 3 illustrates signal flow in a steer-by-wire system according to an embodiment of the invention.

FIG. 3 illustrates a signal flow system 150 for the SbW system 10. The signal flow system 150 includes the detector 30, the steering control subsystem 50, the braking control subsystem 55, and the drivetrain control subsystem 60. Additional vehicle subsystems can be used in other embodiments of the invention. The steering control subsystem 50 includes a steering control device 155 and a steering actuator 160. The braking control subsystem 55 includes a braking control device 165 and a braking actuator 170. The drivetrain control subsystem 60 includes a drivetrain control device 175 and a drivetrain actuator 180. As described above, each actuator can include multiple components and actuators. Each of the control subsystems is described in greater detail below. A steering input is applied to the driver input device 25 and detected by the detector 30. For each input from a driver using the driver input device 25, one or more input signals are generated by the detector 30 and sent to the controller 45. A command input signal is then sent to at least one of the steering control subsystem 50, the braking control subsystem 55, and the drivetrain control subsystem 60. In some embodiments, each control subsystem receives the command input signal.

The controller 45 is configured to operate in one of a plurality of different modes. The operational mode of the controller 45 determines which control subsystem(s) receives the command input signals. A first operational mode is a default or normal operational mode. The controller 45 is in the first operational mode when the steering control subsystem 50 is functioning properly (i.e., no failures have been detected or sensed). In the first operational mode, the command input signal is sent to the steering control subsystem 50. The steering control device 155 converts the steering input from the driver into a steering control signal required by the steering actuator 160. The steering actuator 160 receives the steering control signal from the steering control device 155 and generates a mechanical steering output which is used to alter a steering direction of at least two wheels 20 (e.g., turning wheels).

If a failure in one of more of the components of the SbW system 10 is detected, the controller 45 operates in a second operation mode (or failure mode). A failure may occur in a variety of ways. For example, a malfunction may occur in the steering control device 155, the steering actuator 160, or both. When a failure occurs, the steering control device 155 does not output correct steering control signals (or any control signals) to the steering actuator 160; or the steering actuator 160 does not correctly respond to control signals. In the failure mode, the controller 45 sends command signals (based on the driver input as detected by the detector) to one or more of the plurality of vehicle control subsystems, such as the braking control subsystem 55 or the drivetrain control subsystem 60.

Under some circumstances, control of the vehicle (i.e., turning) is accomplished by using both the braking and drivetrain control subsystems 55 and 60 (i.e., an active control technique is implemented). In other circumstances, control of the vehicle is accomplished using only the braking control subsystem 55.

In the description that follows, references are to an embodiment of the invention where the controller 45 sends control signals (or commands) to the braking and drivetrain control subsystems 55 and 60 when the controller 45 is in the failure mode. The controller 45 monitors each control subsystem. In some embodiments, the controller 45 modifies the commands sent to each control subsystem such that the vehicle 15 does not overcompensate for the intended input action. For example, in some embodiments the controller 45 monitors the subsystems 55 and 60 to ensure proportional action of the subsystems on the vehicle.

After the braking and the drivetrain control devices 165 and 175 convert the command input signal from the controller 45 into braking control signals and drivetrain control signals, the control signals are sent to the braking actuator 170 and the drivetrain actuator 180, respectively. The braking actuator 170 and the drivetrain actuator 180 produce a mechanical action (or, more generically, a force) that alters the direction of the vehicle 15 in accordance with the steering input. A braking force is exerted on single wheel or multiple wheels to remove energy from the vehicle. If the force is applied to multiple wheels, the forces are applied in ratios to achieve the intended steering input action. For example, if the braking forces are applied to multiple wheels and the intended steering input action is a right turn, a braking force is applied to the front right and the back right wheels. No braking force or a proportionally small braking force is applied to the left side wheels to prevent a cancellation of the effect of the braking force applied to the right side wheels.

The drivetrain actuator 180 produces forces that are applied to one or more wheels. When the vehicle 15 is moving in a forward direction or a reverse direction, torque is supplied (from one or more engines) to drive axles (the front, rear, or front and rear axles) to add energy to the vehicle 15. In some embodiments, the vehicle 15 is traveling in either the forward or the reverse direction and torque is supplied independently to each of the front wheels, independently to each of the rear wheels, or independently to each of the front wheels and the rear wheels. Descriptions made herein related to the SbW system 10 are made with respect to an embodiment of the invention in which torque is being supplied independently to each of the front wheels and each of the rear wheels. The drivetrain control device 175 is configured to produce signals and the drivetrain actuator 180 is configured to add energy to the vehicle by exerting forces, such as torques, that are used to change the direction of the vehicle 15. The drivetrain actuator 180 produces a differential force between each of the front wheels and the rear wheels. For example, a right steering maneuver executed using differential forces requires a greater motive force (in magnitude) on the front left wheel and the rear left wheel than the front right wheel and the rear right wheel, respectively. The controller 45 adjusts the distribution of applied torque to achieve the differential force necessary to execute the intended steering input action.

Figure 4:
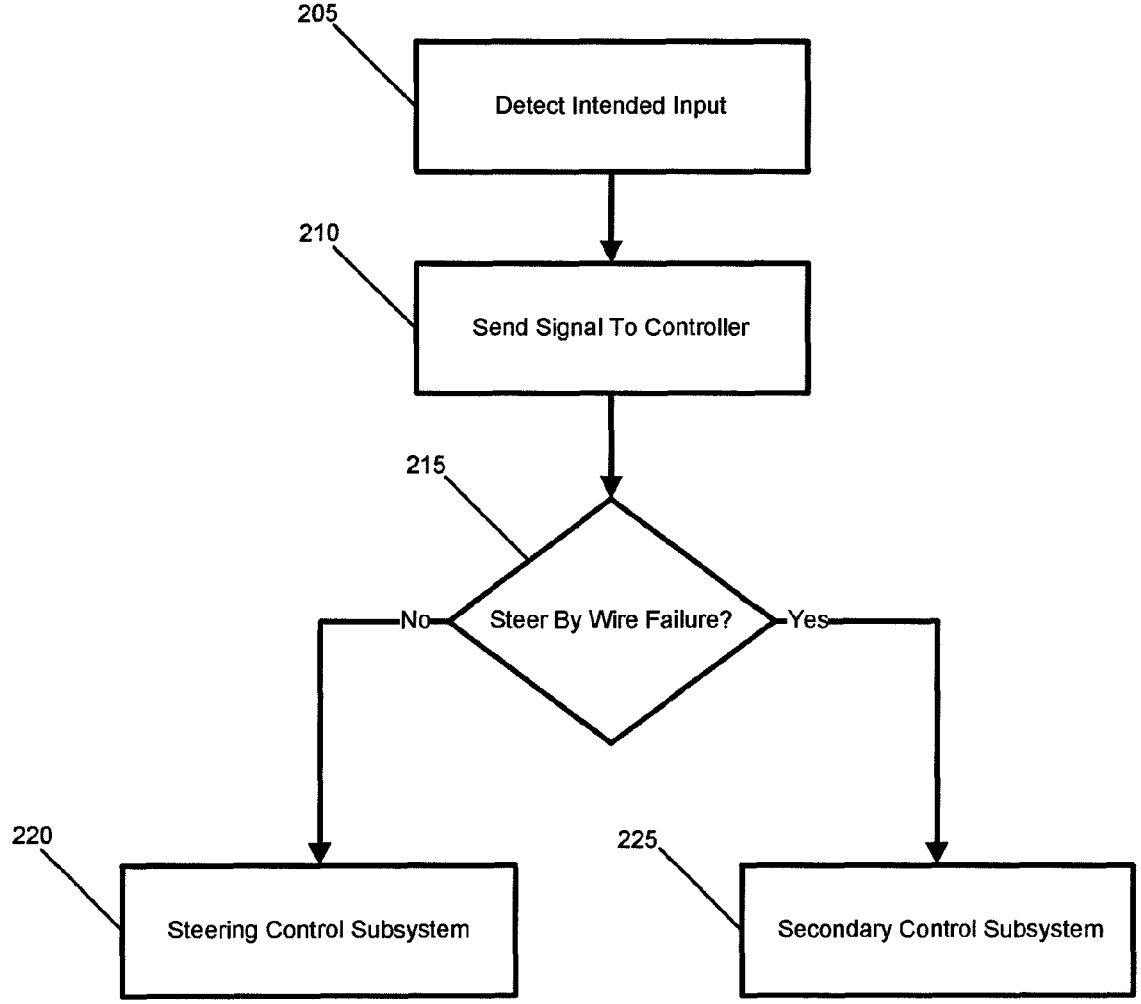
FIG. 4 illustrates a process for controlling the steer-by-wire system of FIG. 3.
Figure 5:
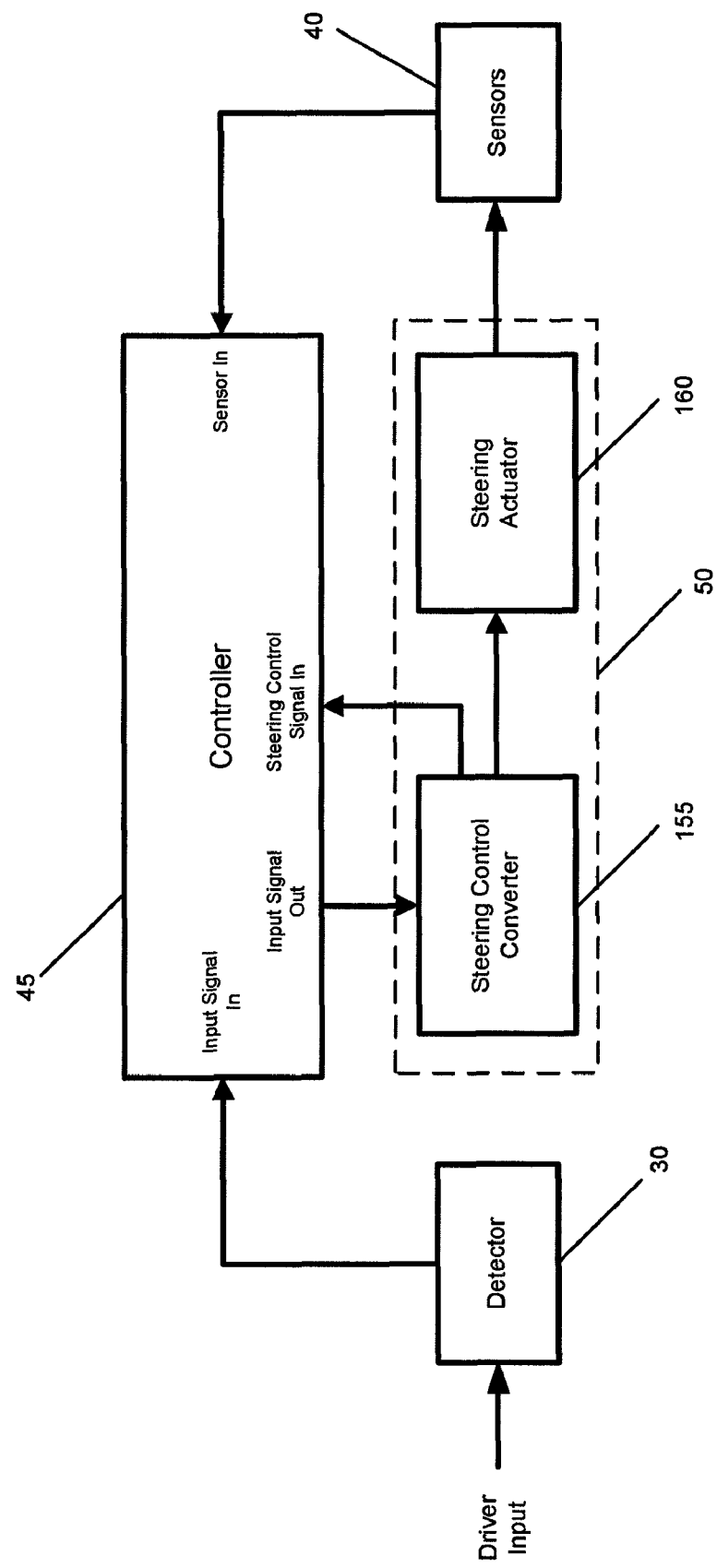
FIG. 5 illustrates a system for identifying a failure mode.

FIG. 4 illustrates a process 200 for controlling the vehicle 15 with the SbW system 10 in the event of a SbW failure. The process 200 begins when the driver applies a steering input to the driver input device 25. The steering input corresponds to a desired direction of the vehicle 15. For example, the steering input can be an indication to turn left, turn right, or proceed straight ahead (maintain current direction). The steering input is converted to an input signal(s) and sent to the controller 45. As described above, the controller 45 includes or is coupled to the steering control subsystem 50, the braking control subsystem 55, and the drivetrain control subsystem 60. The controller 45 then determines whether a failure exists. For example, as illustrated in FIG. 5, the controller 45 receives input signals from the detector 30. The controller 45 sends commands based on the input signals from the detector to the steering control subsystem 50. Steering control signals are then sent from the steering control device 155 to the steering actuator 160 and the controller 45. The controller 45 then compares the input from the steering control device 155 to the signals from the detector 30 to determine whether the steering control device 155 is functioning properly (e.g., outputting expected control signals). Additionally or alternatively, the controller 45 monitors the output of the steering actuator 160 using the plurality of sensors 40. For example, the controller 45 monitors wheel angle sensors, lateral acceleration sensors, longitudinal acceleration sensors, force sensors, speed sensors, and the like. If the controller 45 determines that the SbW system 10 is functioning properly, command signals are sent (or continue to be sent) to the steering control device 155 (with appropriate signals then sent to the steering actuator 160). If the controller 45 determines that a failure has occurred in the SbW system, the controller 45 sends commands to secondary steering devices (e.g., the braking control subsystem 55 or drivetrain control subsystem 60).

Figure 6:
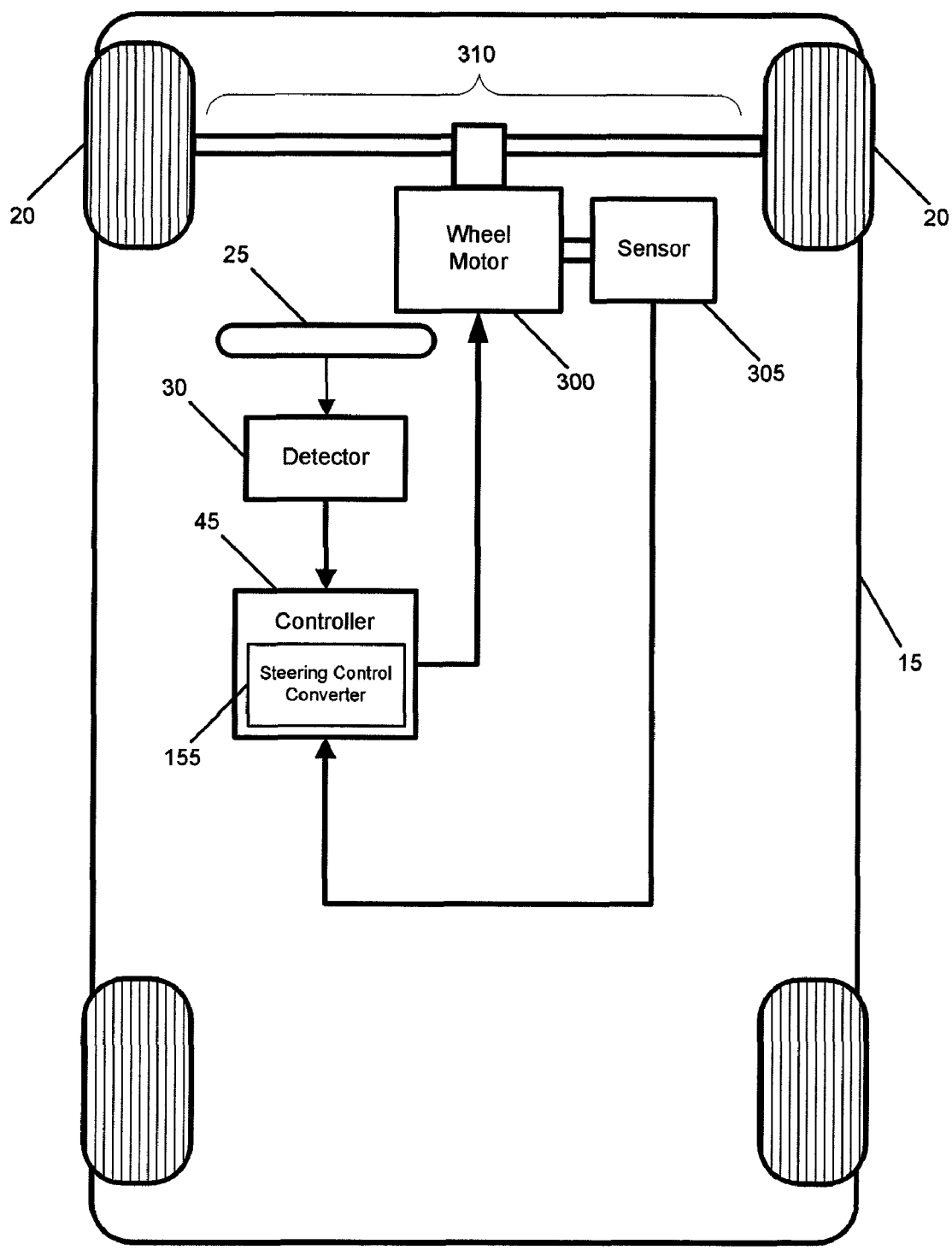
FIG. 6 illustrates a steering control subsystem of a steer-by-wire system.

FIG. 6 illustrates the steering control subsystem 50. The steering control subsystem 50 includes, among other things, a wheel motor 300, a steering sensor 305, and a rack and pinion assembly 310. As described above, the detector 30 detects a steering input from the driver. The detector 30 sends a corresponding input signal to the controller 45. In the illustrated embodiment, the controller 45 is in the first control mode (non-failure mode). As a result, the controller 45 sends the command input signal to the steering control subsystem 50. The steering control signal is then sent from the steering control device 155 to the wheel motor 300. For descriptive purposes, the wheel motor 300 is illustrated as a single motor in FIG. 5. However, the multiple motors could be used, such as one motor for each wheel. The steering control subsystem 50 can also include one or more motor drives which control the one or more wheel motors. The wheel motor 300 receives the steering control signal from the steering control device 155 and generates a mechanical output by moving the rack and pinion assembly 310. The rack and pinion assembly 310, in turn, alters an angle of the wheels and the direction of the vehicle 15. The rack and pinion assembly 310 includes additional components (not shown) for steering the vehicle 15, such as, among other things, tie rods and/or kingpins. The steering sensor 305 is, for example, an angle sensor mounted to the wheel motor 300 or the rack and pinion assembly 310 to sense the position of the rack and pinion assembly 310. An output of the steering sensor 305 is then fed back to the controller 45 such that the controller 45 is capable of monitoring the actual angles of the wheels. In other embodiments, different steering control subsystems can be used, such as, for example, steering control subsystems that do not include a rack and pinion assembly 310.

Figure 7:
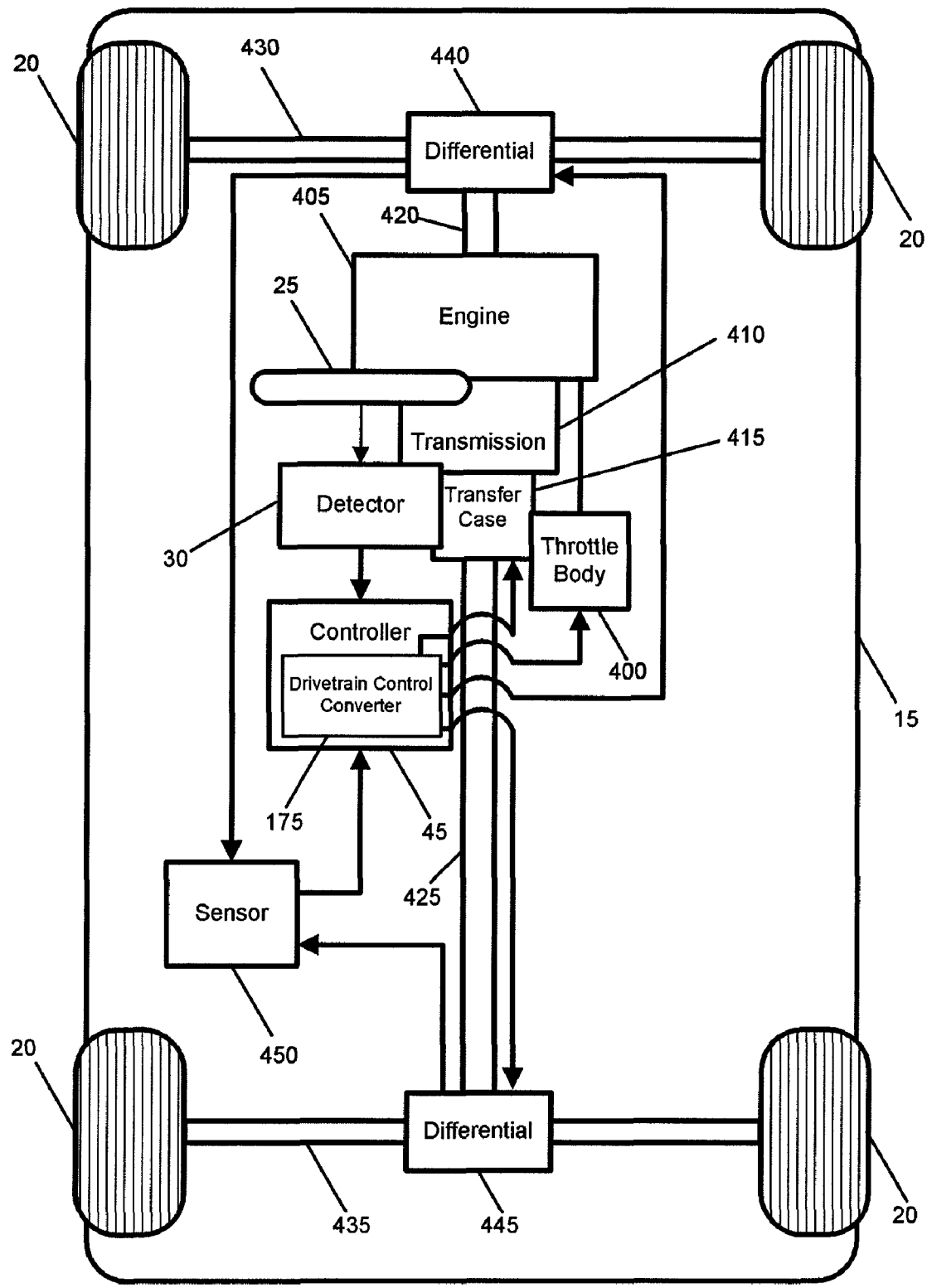
FIG. 7 illustrates a drivetrain control subsystem of a steer-by-wire system.
Figure 8:
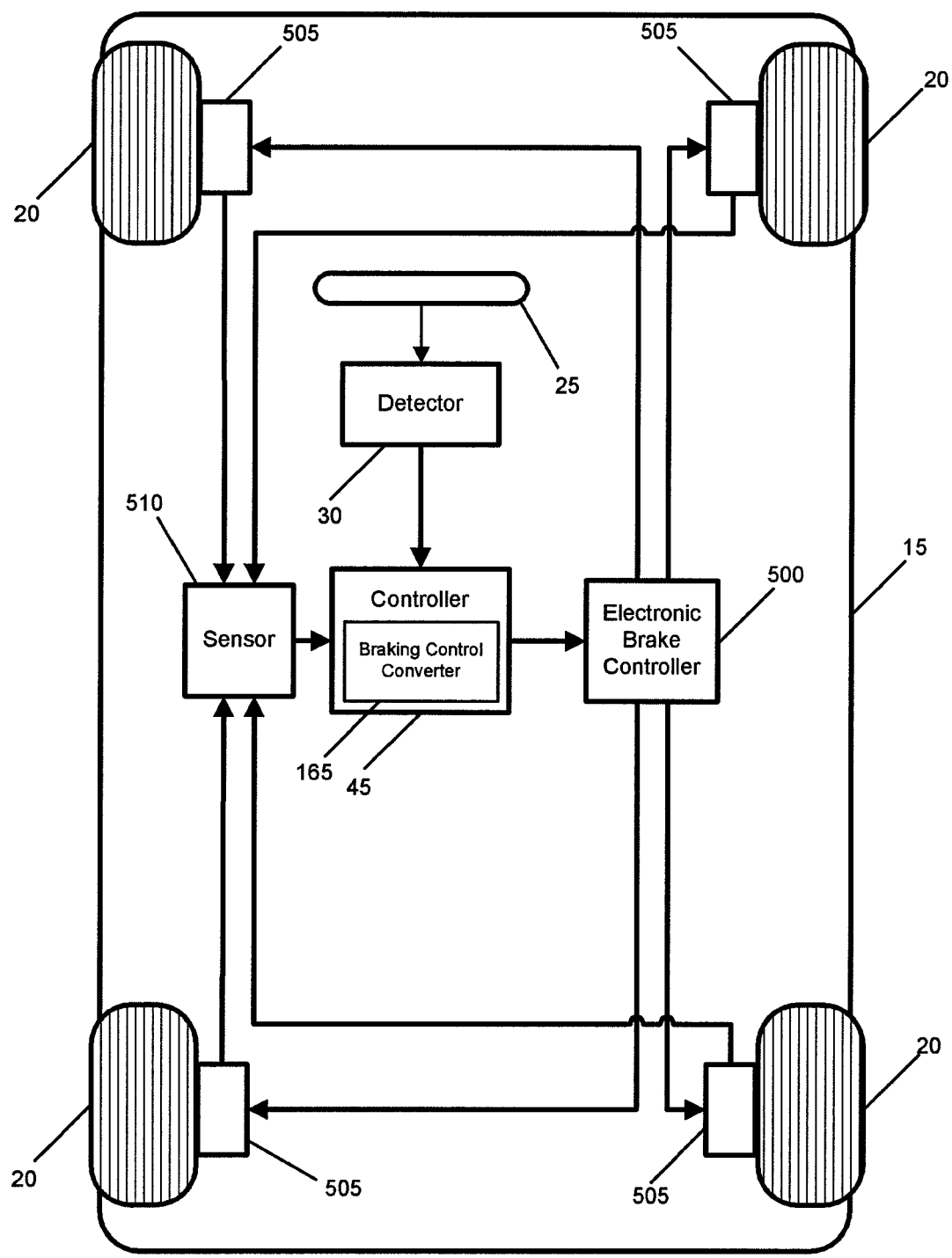
FIG. 8 illustrates a braking control subsystem of a steer-by-wire system.

FIG. 7 illustrates the drivetrain control subsystem 60. The drivetrain control subsystem 60 includes, among other things, a throttle body 400, an engine 405, a transmission 410, a transfer case 415, a front driveshaft 420, a rear driveshaft 425, a front axle 430, a rear axle 435, a front active center differential 440, a rear active center differential 445, and a differential sensor 450. As described above, the detector 30 detects the steering input from the driver. The detector 30 sends a corresponding input signal to the controller 45. In the illustrated embodiment, the controller 45 is in the failure mode. As a consequence, the controller 45 sends the command input signals to both the drivetrain control subsystem 60 and the braking control subsystem 55 (as illustrated in FIG. 8). A first drivetrain control signal is sent from the drivetrain control device 175 to the throttle body 400. The throttle body 400 controls the amount of air flowing into the engine 405 in response to the drivetrain control signal. The engine 405 responds to the change in airflow by the throttle body 400 and produces more or less torque. The controller 45 also regulates driver commanded energy input to prevent interference with the operation of the drivetrain control subsystem 60 during the failure mode.

The drivetrain control subsystem 60 also regulates a control response time interval (time required to execute an intended steering input action) by increasing or decreasing torque applied to each wheel 20 at different rates (i.e. adding energy to or removing energy from the vehicle at different rates). The torque from the engine 405 is transmitted through the transmission 410 to the transfer case 415 to the front driveshaft 420 and the rear driveshaft 425 based on a torque differential signal from the drivetrain control device 175. The front driveshaft 420 is coupled to the front axle 430 and the rear driveshaft 425 is coupled to the rear axle 435. Both the front axle 430 and the rear axle 435 include active center differentials 440 and 445, respectively. The front and rear active center differentials 440 and 445 receive additional drivetrain control signals from the drivetrain control device 175 to control the torque applied to each wheel 20 and output condition signals to a differential sensor. Based on the values from the differential sensor 450, which are input to the controller 45, the drivetrain control subsystem 60 adjusts the torque applied to each of the wheels 20 by electronically controlling at least one of the front and rear active center differentials 440 and 445, the transfer case 415, and the throttle body 400. For example, if the steering input is a change in the direction of the vehicle 15 to the right, the front and rear active center differentials 440 and 445 supply additional torque to the left front and left rear wheels, which causes the left front and left rear wheels to rotate faster that the right front and right rear wheels. The differences in torque supplied by the active center differentials 440 and 445 result in the differential forces described above with respect to FIG. 2. The direction of the vehicle 15 is then altered to the right. In other embodiments of the invention, different drivetrain configurations or components can be used. For example, the transmission 410 can receive electronic control signals from the drivetrain control device 175 to control the amount of torque that is applied to the wheels 20.

FIG. 8 illustrates the braking control subsystem 55. The braking control subsystem 55 includes an electronic brake controller 500, and a plurality of electronically controlled brakes 505, and a brake sensor 510. As described above, the detector 30 detects a steering input from the driver input device 25. The input signal is then sent to the controller 45. In the embodiment illustrated in FIG. 8, the controller 45 is in the failure mode. As a consequence, the controller 45 sends command input signals to both the braking control subsystem 55 and the drivetrain control subsystem 60 (as illustrated in FIG. 7). The braking control device 165 receives the command input signals and converts them to braking control signals that are sent to the electronic brake controller 500. The electronic brake controller 500 then generates and sends corresponding brake signals to each of the brakes 505, which actuate valves within the brakes 505 with variable forces. The brake sensor 510 monitors the braking forces that are applied to the wheels 20 by each of the brakes 505. The brake sensor 510 is connected to the controller 45 such that the braking control device 165 receives the information related to the actual braking forces applied to the wheels 20. The braking control device 165 uses the braking information to modify or maintain the brake control signals that are applied to each brake 505. For example, if the intended steering input action is a change in the direction of the vehicle 15 to the right, the front right and rear right brakes apply a greater braking force than the braking force that is applied (if any) to the left front and left rear brakes. The effect of the differences in braking forces applied by the brakes 505 cause the front right and rear right wheels to rotate at a speed that is less than that of the left front or left rear wheels. As a result, the vehicle 15's direction is altered to the right. In other embodiments of the invention, different braking control subsystem configurations and components can be used.

Thus, the invention provides, among other things, a steer-by-wire failure mode mitigation system that uses a plurality of vehicle control subsystems to steer a vehicle in the event of a steer-by-wire failure mode. Various features and advantages of the invention are set forth in the following claims.

What is claimed is:

1. A steer-by-wire failure mode mitigation system for a vehicle, the system comprising:
   a driver input device configured to receive a steering input from a driver of the vehicle;
   a detector configured to detect the steering input and to output a signal representative of the steering input;
   a first control device;
   a second control device that is different than the first control device;
   a third control device that is different than the first control device and the second control device;
   a controller configured to operate in either a first operational mode or a failure mode, the controller coupled to the detector, the first control device, the second control device, and the third control device, the controller configured to determine whether the first, second, and third control devices are functioning properly, operate in the failure mode if one or more of the control devices are functioning improperly, and, while in the failure mode, send command input signals only to those control devices that are functioning properly to control and monitor those control devices;

a first actuator coupled to the first control device, the first control device configured to receive a first command input signal from the controller, when the controller is in the first operational mode, generate a first control signal representative of the steering input, and transmit the first control signal to the first actuator;

wherein the first actuator is configured to generate a first mechanical output to alter a direction of a first wheel and a second wheel;

a second actuator coupled to the second control device, the second control device configured to receive the first command input signal from the controller, when the controller is in the failure mode, generate a second control signal representative of the steering input, and transmit the second control signal to the second actuator;

wherein the second actuator is configured to generate a second mechanical output to exert a first force on the first wheel in a first direction; and a third actuator coupled to the third control device, the third control device configured to receive the first command input signal from the controller, when the controller is in the failure mode, generate a third control signal representative of the steering input, and transmit the third control signal to the third actuator;

wherein the third actuator is configured to generate a third mechanical output to exert a second force on the second wheel in a second direction.

2. The system of claim 1, wherein the first force is a braking force and the second force is a torque.

3. The system of claim 1, wherein the driver input device is a steering wheel.

4. The system of claim 1, wherein the first control device is a steering control device, the second control device is a braking control device, and the third control device is a drivetrain control device.

5. The system of claim 1, wherein the first force and the second force alter a direction of the vehicle in accordance with the steering input.

6. The system of claim 1, wherein the failure mode includes a malfunction in at least one of the first control device or the first actuator.

7. The system of claim 1, wherein the first force and the second force alter a direction of the vehicle during a control response time interval.

8. The system of claim 1, wherein the first force removes energy from the vehicle and the second force adds energy to the vehicle.

9. The system of claim 7, wherein the control response time interval is controlled by adding energy to or removing energy from the vehicle at different rates.

10. A method for steering a vehicle during a steer-by-wire failure, the method comprising: receiving a steering input from a driver of the vehicle;

detecting the steering input with a detector, the detector outputting a signal representative of the steering input to a controller configured to operate in either a first operational mode or a failure mode, the controller configured to determine whether a plurality of control devices are functioning properly and to send command input signals, operate in the failure mode if one or more of the plurality of control devices are functioning improperly, and, while in the failure mode, send command input signals only to those control devices that are functioning properly to control and monitor those control devices;

receiving, at a first control device, a first command input signal from the controller when the controller is in a first operational mode, the first control device generating a first control signal representative of the steering input and transmitting the first control signal to a first actuator;

wherein the first actuator alters a direction of a first wheel and a second wheel;

receiving, at a second control device, the first command input signal from the controller when the controller is in the failure mode, the second control device generating a second control signal representative of the steering input and transmitting the second control signal to the second actuator;

wherein the second actuator exerts a first force on the first wheel in a first direction;

receiving, at a third control device, the first command input signal from the controller when the controller is in the failure mode, the third control device generating a third control signal representative of the steering input and transmitting the third control signal to the third actuator;

wherein the third actuator exerts a second force on the second wheel in a second direction.

11. The method of claim 10, further comprising configuring the controller to be in one of the first operational mode or the second operational mode, wherein the first operational mode is a normal operational mode and the second operational mode is a failure mode.

12. The method of claim 10, wherein the first control device is a steering control device, the second control device is a braking control device, and the third control device is a drivetrain control device.

13. The method of claim 10, wherein the first force and the second force alter a direction of the vehicle.

14. The method of claim 10, wherein the first force removes energy from the vehicle and the second force adds energy to the vehicle.

15. A steer-by-wire system for a vehicle, the system comprising:

a controller configured to alter a direction of the vehicle during a steer-by-wire failure, the controller configured to operate in either a first operational mode or a failure mode, determine whether a plurality of control devices are functioning properly and to send command input signals, operate in the failure mode if one or more of the plurality of control devices are functioning improperly, and, while in the failure mode, send command input signals only to those control devices that are functioning properly to control and monitor those control devices;

a steering device coupled to a detector, the detector configured to detect a steering input from a driver and output a signal representative of a steering input;

a first actuator coupled to a first control device, the first control device configured to generate a first control signal representative of the steering input when it receive a first command input signal from the controller and the controller is in a failure mode;

wherein the first actuator alters a direction of the vehicle by removing energy from the vehicle; and a second actuator coupled to a second control device, the second control device configured to generate a second control signal representative of the steering input when it receive a first command input signal from the controller and the controller is in the failure mode;

wherein the second actuator alters the direction of the vehicle by adding energy to the vehicle.

16. The system of claim 15, wherein the controller is configured to be in one of a first operational mode or the failure mode.

17. The system of claim 15, wherein the controller is coupled to the first control device and the second control device.

18. The system of claim 15, wherein the first mechanical output exerts a braking force and the second mechanical output exerts a torque.

19. The system of claim 15, wherein the steering device is a steering wheel.

20. The system of claim 15, wherein the direction of the vehicle is altered during a control response time interval.

21. The system of claim 20, wherein the control response time interval is altered by adding energy to or removing energy from the vehicle at different rates.

* * * * *